United States Patent [19]

Flores, Sr. et al.

[11] Patent Number: 5,374,034

[45] Date of Patent: Dec. 20, 1994

[54] APPARATUS FOR INSTALLING A LINE THROUGH CONDUITS

[75] Inventors: Reuben M. Flores, Sr.; Roy L. Flores, Jr., both of San Antonio, Tex.

[73] Assignee: Fast Laing Industries, Inc., San Antonio, Tex.

[21] Appl. No.: 115,865

[22] Filed: Sep. 2, 1993

[51] Int. Cl.⁵ ............................................. B65H 59/00
[52] U.S. Cl. ................................................. 254/134.4
[58] Field of Search .................. 254/134.4, 134.3 FT, 254/134.3 R; 226/97; 15/104.06

[56] References Cited

U.S. PATENT DOCUMENTS

| | | |
|---|---|---|
| 423,134 | 3/1890 | Cope . |
| 443,823 | 12/1890 | Cope . |
| 979,899 | 12/1910 | Steigleder . |
| 2,470,338 | 5/1949 | Chilton . |
| 3,006,607 | 10/1961 | Hamrick . |
| 3,034,766 | 5/1962 | Hamrick . |
| 3,119,600 | 1/1964 | Bitter . |
| 3,179,375 | 4/1965 | Hamrick . |
| 3,244,402 | 4/1966 | Ensley . |
| 3,244,403 | 4/1966 | Ensley . |
| 3,246,878 | 4/1966 | Hamrick . |
| 3,301,531 | 1/1967 | Corsiglia . |
| 3,669,087 | 6/1972 | Hamrick et al. . |
| 3,689,031 | 9/1972 | Ruddick et al. . |
| 3,793,732 | 2/1974 | Hamrick . |
| 3,837,624 | 9/1974 | Dandurand . |
| 3,927,866 | 12/1975 | Linquist . |
| 4,043,537 | 8/1977 | Russo, Jr. . |
| 4,083,533 | 4/1978 | Schwabe . |
| 4,429,428 | 4/1984 | Van Dyk . |
| 4,498,659 | 2/1985 | Brockelsby, III . |
| 4,726,564 | 2/1988 | Lynn . |
| 4,953,862 | 9/1990 | Uke et al. ............................. 81/484 |
| 5,118,226 | 6/1992 | Horii et al. . |
| 5,121,644 | 6/1992 | Grey et al. . |

Primary Examiner—Robert C. Watson

[57] ABSTRACT

A line installing apparatus includes a handle formed integrally with a spool having a line connected to and wound about the spool. A shield mounts to the handle and is positioned about the spool to guide the line from the spool during its discharge. The handle includes a push button operated valve which controls the delivery of compressed gas from a compressed gas source through a passageway within the handle to a hose connected at the outlet of the passageway from the handle. A nozzle connects at the opposite end of the hose to deliver the compressed gas into a conduit. The opposite end of the line from the end connected to the spool passes through a passageway within the nozzle and attaches to a line carrier at the outlet side of the nozzle.

5 Claims, 2 Drawing Sheets

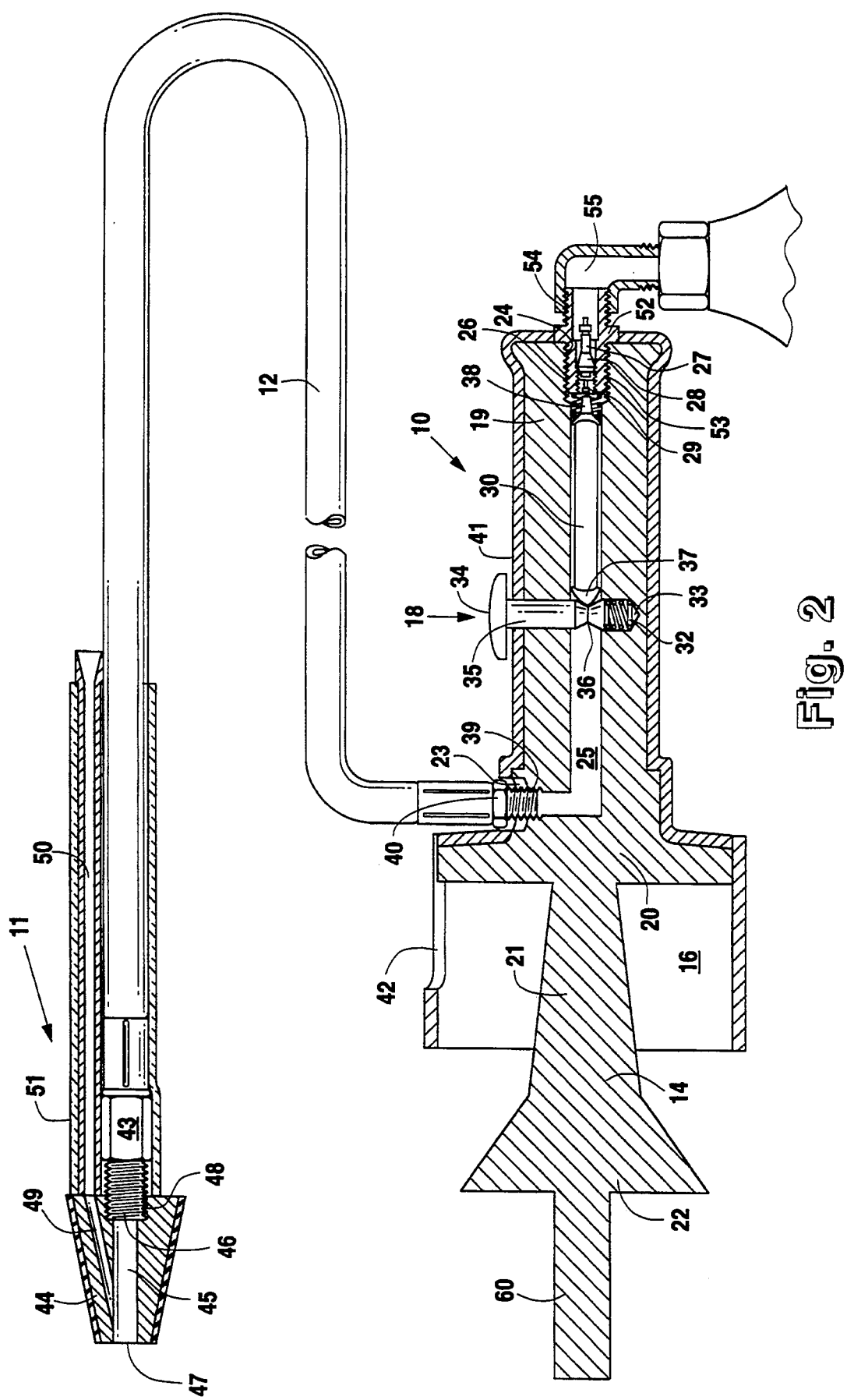

APPARATUS FOR INSTALLING A LINE THROUGH CONDUITS

BACKGROUND OF THE INVENTION

1. Field of the Invention

The present invention relates to apparatus for propelling a line through conduits to expedite the process of stringing electrical wires through the conduits. More particularly, but not by way of limitation, the present invention relates to an apparatus for propelling a line through conduits that is hand held, connects easily to a source of pressurized gas, and utilizes a heavy duty line which may be quickly and easily rewound for reuse.

2. Description of the Related Art

The safe transfer of electrical power along electrical wires requires complete insulation of the wires to prevent shorts form occurring. Shorting of the wires must be avoided because shorts pose a fire hazard, present the danger of electrocution to a person contacting the shorted wires, and, at a minimum, cause damage to electronic equipment receiving power through the wires. Typically, electrical wires are encased in rubberized insulation to prevent their shorting. However, that type of insulation cuts easily resulting in the exposure of the wires. Thus, additional methods of protecting electrical wires have been developed. One such method consists of stringing the electrical wires through protective conduits. Unfortunately, the process of actually running the electrical wires through the conduits is tedious as well as time and labor intensive which greatly increases the cost using protective conduits. Accordingly, devices designed to reduce the time and effort required to string electrical wires through conduits have been invented.

U.S. Pat. No. 979,899 issued on Dec. 27, 1910 to Steigleder and U.S. Pat. No. 443,823 issued on Dec. 30, 1890 to Cope both disclose early line threading devices. Those devices include a nozzle connected to a source of compressed air via a flexible tube. Positioned at the exit of the nozzle is a line carrier which connects to a spool of line. In operation, the line carrier is placed within the conduit with the nozzle placed over the conduit inlet. The compressed air source then delivers the compressed air into the conduit via the tube and nozzle to blow the line carrier through the conduit. As the line carrier travels through the conduit, it pulls the line from the spool and into the conduit.

U.S. Pat. No. 3,837,624 issued on Sep. 24, 1974 to Dandurand and U.S. Pat. No. 3,301,531 issued on Jan. 31, 1967 to Corsiglia both disclose similar devices. Those systems employ similar nozzles, flexible tubes, and line carriers connected to a spool of line. However, both devices employ an electrically operated air blower to propel the line carrier through the conduit rather than a source of compressed air. Alternatively, U.S. Pat. No. 3,119,600 issued on Jan. 28, 1964 to Bitter discloses the use of a vacuum cleaner to pull the line carrier and line through the conduit to the vacuum cleaner nozzle.

Although the above devices function adequately to install electrical wires within conduits, they suffer from several disadvantages. First, the sources which propel or pull the line carrier through the conduit are inadequate for conduits used today. Specifically, those sources simply have insufficient power to propel or pull the line carrier all the way through conduit, particularly when the conduit includes many turns. Second, the above devices are bulky making them difficult to transport to job sites and also to use in small spaces. For example, the bulky devices disclosed in the above references would be difficult if not impossible to use in a crawl way or attic. Furthermore, the large nozzles do not adequately fit within some junction boxes (e.g., shallow 2"×4" junction boxes) or other close quarters.

U.S. Pat. No. 4,043,537 issued on Aug. 23, 1977 to Russo, Jr. and U.S. Pat. No. 3,689,031 issued on Sep. 5, 1972 to Ruddick, et al. disclose devices which offer more portability. Russo, Jr. discloses an apparatus for installing a pull line in conduits which includes a tubular body connecting a valve to a line dispensing air chamber. A reel mounts on the tubular body to supply line to a line carrier via the line dispensing air chamber. The valve connects to an air supply tank to regulate the delivery of air through the tubular body and the line dispensing air chamber to the line carrier. Thus, after the line dispensing air chamber is fitted over a conduit and the valve activated, compressed air forces the line carrier through the conduit thereby pulling line from the reel.

Ruddick, et al. disclose an angled nozzle that includes a head formed integrally with a body. The body includes an inlet which allows connection to either a compressed gas bottle or an air blower. The head includes an inlet that allows line to be strung from a spool through the head to a line carrier positioned outside the outlet from the head. After the line carrier is placed within the conduit and the nozzle over the conduit, the valve to the compressed gas bottle is opened or the air blower is turned on to propel the line carrier through the conduit.

The above devices operate adequately in most instances to install pull lines in conduit, however, they also experience the same disadvantages as the air blower-type devices. That is, they are bulky devices that offer problems when used in small places. Specifically, the long tubular construction of their air delivery apparatus makes their use in closed spaces awkward and often impossible.

Furthermore, their construction does not allow their use with high pressure compressed gas sources (e.g., $CO_2$ compressed to 1800 psi), and the compressed gas sources which are employed provide insufficient pressures to propel the line carrier through conduits having many turns. With respect to Russo, Jr., the disclosed reel cannot dispense line fast enough to allow its use with high pressure compressed gas sources. Essentially, the reel does not unspool line quickly enough to keep pace with the line carrier as the high pressure compressed gas propels it through the conduit. As a result, the line will bind within the reel causing it to break. Similarly, the separate spool utilized in Ruddick, et al. is not designed to dispense line at a rate necessary to allow its use with high pressure compressed gas sources. Accordingly, neither of the above device can be employed to install pull lines through long lengths of conduit.

U.S. Pat. No. 4,726,564 issued on Feb. 24, 1988 to Lynn and U.S. Pat. No. 3,927,866 issued on Dec. 23, 1975 to Linquist disclose gun-type hand held pull line installing devices. Linquist discloses a pneumatic blow gun which includes a main body formed integrally with a handle. A guide resides within the handle to provide an inlet for the line into the barrel of the main body. The line carrier resides within the barrel and connects to the line. The line itself is supplied from an ordinary spool residing separate from the pneumatic blow gun. The handle connects to an air blower and includes a passage way to provide pressurized air into the barrel of the main body. Thus, in use, after the barrel is inserted into the conduit and the air blower activated, air travels through the handle into the barrel of the main body to propel the line carrier from the barrel into and through the conduit. However, as previously described, the use of an air blower provides insufficient air pressure to propel the line carrier through any significant length of conduit or through a conduit having many turns.

Lynn discloses a pull line installing device that includes a canister for holding a spool which mounts to a housing having a handle. Line from the spool runs through the housing and out an outlet where it connects to a line carrier. The housing handle connects to a pressurized gas source and includes a passageway to deliver the pressurized gas into the housing. Thus, after the line carrier is inserted into the conduit and the housing outlet is placed over the conduit, the flow of pressurized gas through the handle and housing will propel the line carrier through the conduit. However, similar to the reel disclosed in Russo, Jr., the spool placed within the canister of the Lynn reference cannot unspool fast enough to be used with high pressure compressed gas sources. If the device disclosed in Lynn were connected to a high pressure source of compressed gas, the line would bind along the spool thereby preventing the line carrier and line from being propelled through the entire length of the conduit.

Accordingly, any device which is both hand held for use in small, closed spaces and connects to a high pressure compressed gas source to allow the propelling of a line carrier through any conduit is highly desirable.

SUMMARY OF THE INVENTION

In accordance with the present invention, the apparatus for installing a line within conduits includes a body which connects to a nozzle via a hose. The body connects to a compressed gas source to supply compressed gas to the nozzle. The body includes an easy grip handle formed integrally with a spool. The handle includes a passageway which allows the compressed gas to flow from the compressed gas source through the body into the hose and out the nozzle. A button mounted on the handle controls the flow of compressed air through the passageway. One end of a line connects to the spool and a majority of that line is wound about the spool. The opposite end of the line passes through the nozzle and connects to a line carrier. A shield mounts onto a guard formed integrally as part of the handle to protect the hand of the apparatus user and, more importantly, to provide a guide which directs the line from the spool to prevent it from binding on the spool or tangling.

Thus, to feed the line through a conduit, the line carrier is first placed within the conduit with the nozzle held firmly within the conduit opening. The button on the handle is then depressed to open the compressed gas source and allow the compressed gas to flow through the passageway into the hose and out the nozzle. The compressed gas enters the conduit from the nozzle to propel the line carrier through the conduit. As the line carrier travels through the conduit, it pulls the line behind it to unravel the line from the spool so that, when the line carrier exits the conduit, the line resides within and through the conduit.

It is, therefore, an object of the present invention to provide a line installing apparatus that includes a flexible delivery hose and nozzle which allow its use in extremely tight spaces.

It is another object of the present invention to provide a line installing apparatus that is compact and may be easily carried or worn on a work belt when connected to a source of pressurized gas.

It is a further object of the present invention to provide a line installing apparatus that may be operated by a high pressure gas source so that long conduits or ones having many bends and turns may still be effectively fitted with electrical wires.

It is still another object of the present invention to provide a line installing apparatus that uses a high tensile strength line.

It is still a further object of the present invention to provide a line installing apparatus with a spool that unwinds the line without binding or tangling and, further, allows simple and easy rewinding of the pull line by hand.

Still other objects, features, and advantages of the present invention will become apparent in light of the following.

BRIEF DESCRIPTION OF THE DRAWINGS

FIG. 2 is an enlarged side view taken in cross-section depicting the apparatus for installing a line through conduits.

DETAILED DESCRIPTION OF THE PREFERRED EMBODIMENT

Figure 1:
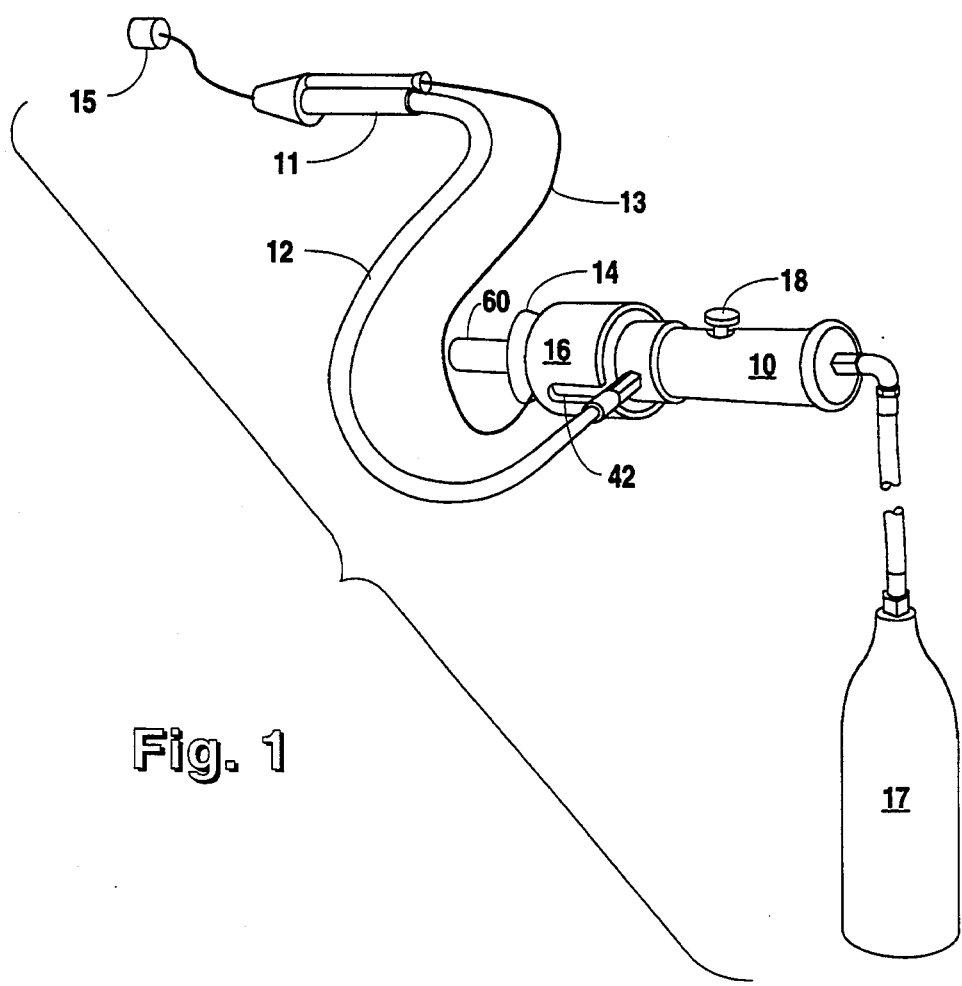
FIG. 1 is a perspective view depicting the apparatus for installing a line through conduits connected to a source of compressed gas.

As shown in FIG. 1, the apparatus for installing a line through conduits includes body 10 which connects to nozzle 11 via hose 12, which in the preferred embodiment comprises a flexible high pressure hose. One end of line 13 connects to spool 14 of body 10 with the majority of line 13 wound about spool 14. The opposite end of line 13 passes through nozzle 11 and connects to line carrier 15, which in the preferred embodiment comprises a rubberized plug. In the preferred embodiment, line 13 comprises a heavy duty, high tensile strength nylon line. Shield 16 mounts onto body 10 to protect the hand of the apparatus user and, more importantly, to provide a guide which directs line 13 from spool 14 to prevent its binding and tangling as it unravels from spool 14.

Body 10 further connects to compressed gas source 17 to supply compressed gas to nozzle 11. In the preferred embodiment, compressed gas source 17 comprises a cylinder holding compressed $CO_2$ gas. Thus, to feed line 13 through a conduit, an apparatus user first places line carrier 15 within the conduit and holds nozzle 11 firmly over the conduit inlet. The apparatus user then depresses button 18 to open compressed gas source 17 thereby allowing compressed gas to flow through body 10 and hose 12 out nozzle 11 and into the conduit to propel line carrier 15 through the conduit. As line carrier 15 travels through the conduit, line 13 unravels from spool 14 so that when line carrier 15 exits the conduit, line 13 will have been run through the conduit.

As shown in FIG. 2, body 10 comprises handle 19 formed integrally with spool 14. In the preferred embodiment, body 10 is fashioned as a single piece from aluminum, however, any suitable metal or other material (e.g., plastic) could be substituted. Spool 14 includes cylindrical guard 20 and base portion 21 formed integrally with head portion 22. Base portion 21 provides a place for one end of line 13 to be secured and, further, provides a mount about which line 13 may be wound before discharge into a conduit. Head portion 22 functions to prevent line 13 from prematurely unraveling from base portion 21 before discharge.

Spool 14 further includes post 60 formed integrally with head portion 22. Post 60 furnishes a mount for line 13 which allows the apparatus user to pull line 13 back through the conduit without placing unnecessary stress on spool 14. To pull line 13 back through the conduit, the user winds a few turns of the unspooled portion of line 13 around post 60 to secure line 13 to post 60 and relieve the tension of line 13 from spool 14. Once line 13 has been secured about post 60, the user grips both post 60 and handle 19 and draws body 10 from the conduit to pull line 13 back through the conduit thereby dragging both line 13 and the electrical wire attached to line 13 back through the conduit. Post 60, therefore, prevents line 13 from being wound tightly about spool 14. If line 13 were wound too tightly about spool 14, it would not unspool properly during the propelling of line carrier 15 through the conduit.

Handle 19 includes guard 20 which functions with shield 16 (described herein) to protect the user's hand during the uncoiling of pull line 13. Handle 19 includes outlet 23 which supplies an exit for the compressed gas from body 10. Handle 19 provides the user with an accessible grip which allows the user to easily manipulate button 18 while firmly holding body 10 to release the compressed gas from compressed gas source 17. Handle 19 includes inlet 24 which furnishes an entrance for the compressed gas into body 10.

Passageway 25 connects inlet 24 to outlet 23 to supply the compressed gas with a path to flow through body 10. Inlet 24 includes threads 26 so that valve 27 may be threadably connected to inlet 24. Valve 27 includes fitting 52 which has threads 53 at its outlet end and threads 54 at its inlet end. Thus, threads 53 of fitting 52 engage threads 26 of inlet 24 to mount valve 27 within inlet 24. In the preferred embodiment, valve 27 comprises a Schraeder valve. Valve 27 further includes valve body 28 and needle 29 which manipulates valve body 28 to open and close valve 27.

Button 18 and rod 30 provide the user with control over the opening and closing of valve 27. Specifically, prior to the threadable connection of valve 27 to inlet 24, rod 30 and then spring 31 are inserted into passageway 25. Additionally, spring 32 and then button 18 are inserted into cavity 33 which intersects passageway 25 and is positioned substantially perpendicular to it. Button 18 comprises head 34 formed integrally with shaft 35. Shaft 35 includes groove 36 which is cut into the end of shaft 35 opposite from head 34. Rod 30 includes tapered end 37 which resides within groove 36 when button 18 is not depressed. Rod 30 further includes pin 38 which is positioned at the end opposite from tapered end 37 and resides over needle 29 of valve 27. As long as tapered end 37 resides within groove 36, valve 27 remains closed.

Passageway 25 terminates at outlet 23 which delivers the compressed gas from body 10 into hose 12. Outlet 23 includes threads 39 so that fitting 40 attached to hose 12 may be inserted therein. Similarly, threads 54 at the inlet end of fitting 52 of valve 27 permit the quick and easy connection of a source of compressed gas. In the preferred embodiment, for example, L-shaped fitting 55 may be threadably connected to fitting 52 to provide a connection point for the compressed gas source 17 shown in FIG. 1. Alternatively, a high pressure hose could be threadably connected to fitting 52 so that larger sources of compressed gas could be utilized. Illustratively, a fifty pound cylinder storing $CO_2$ pressurized to 1800 psi could be connected to body 10 using a hose having a standard female fitting at each end.

Handle 19 includes cover 41 which completely surrounds handle 19 from the underside of guard 20 to the bottom of handle 19. That is, except for inlet 24, outlet 23 and cavity 33, handle 19 is completely encased by cover 41. Cover 41 comprises a rubberized material which serves as a grip and is formed about handle 19 using any suitable method. Illustratively, handle 19 could be dipped into a molten rubberized material and then withdrawn so that the rubberized material will harden about handle 19 to form cover 41. Additionally, after the rubberized material hardens openings are cut to expose inlet 24, outlet 23 and cavity 33.

Cover 41 provides a smooth gripping surface and, further, functions as insulation. Gases such as $CO_2$ when pressurized to large pressures produce an extremely cold gas flow when released. If handle 19 was not supplied with cover 41, it would rapidly cool to a point where the user could not handle it during continued release of the compressed gas. Accordingly, cover 41 is necessary to allow the comfortable gripping of handle 19 by the apparatus user.

Shield 16 protects the apparatus user's hand from line 13 and, more importantly, functions as a guide for line 13 as it unravels in a circular rotation from spool 14. Shield 16 comprises a cylinder which is open at both ends. In the preferred embodiment, shield 16 comprises aluminum, however, any other suitable metal or material (e.g., plastic) may be substituted. Shield 16 mounts to body 10 merely by being slid over the edges of guard 20 where it is held in place by friction. Shield 16 by virtue of its circular shape and close proximity about spool 14 directs line 13 in a small circle about spool 14 as it unravels. Without shield 16, line 13 would have a tendency to unwind from spool 14 in large sections resulting in its binding on spool 14 or its tangling.

Additionally, shield 16 includes slot 42 which is provided to make the rewinding of line 13 easy. That is, with line 13 rewound, shield 16 mounts about the edges of guard 20. However, to rewind line 13, shield 16 is rotated so that slot 42 resides over top of hose 12 (see FIG. 1). After positioning slot 42 over hose 12, shield 16 is forced down about handle 19 to expose base portion 21 of spool 14. With base portion 21 exposed, line 13 may be easily rewound by hand about spool 14. Once line 13 has been rewound, shield 16 is pushed back around base portion 21 of spool 14 and rotated so that slot 42 no longer resides directly over hose 12.

The end of hose 12 opposite from the end which includes fitting 40 terminates in fitting 43 to provide the connection point between hose 12 and tip 44 of nozzle 11. In the preferred embodiment, tip 44 comprises a conically shaped aluminum block, however, other shapes, suitable metals, or materials (e.g., plastics) may be substituted. Tip 44 includes passageway 45 having inlet 46 and outlet 47. Inlet 46 includes threads 48 which allow threadable connection between fitting 43 and tip 44. Tip 44 also includes passageway 49 which inlets into passageway 45 and provides the conduit through tip 44 for line 13.

Nozzle 11 further includes catheter 50 which supplies the guide for line 13 into tip 44. Accordingly, the outlet from catheter 50 lines up with the inlet into passageway 49 of tip 44 to provide a completely open path from the inlet of catheter 50 into passageway 45 and out outlet 47 of passageway 45. Thus, to connect line 13 to nozzle 11 the end of line 13 to be connected to line carrier 15 is run through catheter 50 into passageway 49 and out outlet 47 of passageway 45. After exiting outlet 47, line 13 is connected to line carrier 15 using any suitable means. Illustratively, line 13 could be inserted through a passageway within line carrier 15 and tied off to secure it to line carrier 15.

Nozzle 11 includes cover 51 to connect catheter 50 to hose 12 and ensure its outlet lines up with the inlet into passageway 49 and, further, to provide insulation for nozzle 11. Cover 51 comprises a similar rubberized material to cover 41 and may be formed using any suitably similar material or method. Illustratively, catheter 50 is lined up with passageway 49 and secured to hose 12 using any suitable means such as tape. Once catheter has been secured, tip 44 and a portion of catheter 50 and hose 12 are dipped into a molten rubberized material and then withdrawn to allow the rubberized material to harden into cover 51. After the rubberized material hardens, it is cut to expose outlet 47 from tip 44. Accordingly, with cover 51 surrounding nozzle 11, catheter 50 will be firmly secured to hose 12 and tip 44. Furthermore, cover 51 provides insulation that allows a user to hold nozzle 11 even though the compressed gas emitted therefrom is extremely cold.

Figure 3:
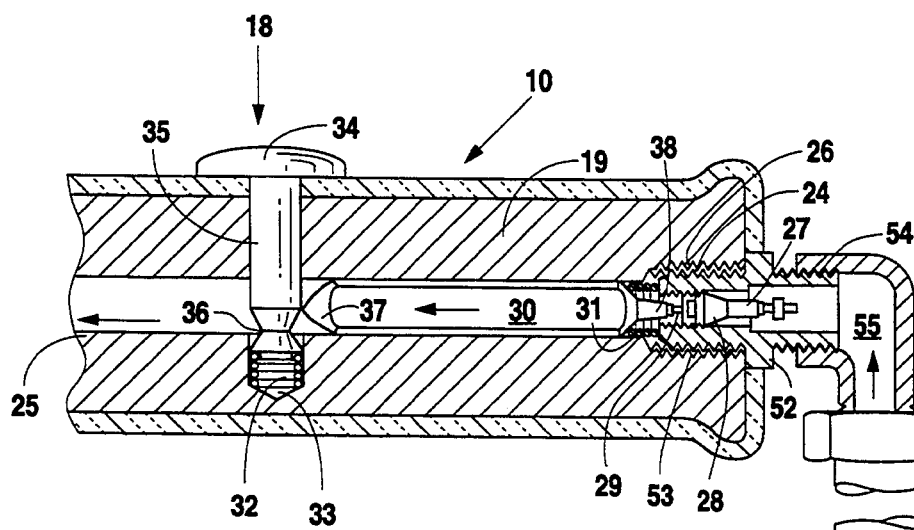
FIG. 3 is a fragmentary, enlarged side view taken in cross section depicting the handle of the apparatus for installing a line through conduits.

To operate the apparatus and install line 13 through a conduit, a user first connects body 10 to a suitable source of compressed gas using threads 54 of fitting 52. Second, the user places line carrier 15 within the conduit and forces tip 44 of nozzle 11 into the conduit opening until tip 44 completely closes that opening. Finally, while gripping handle 19, the user depresses button 18 to place button 18 in the position shown in FIG. 3. As a result, compressed gas flows from the compressed gas source into body 10.

Specifically, the depression of button 18 compresses spring 32 to allow shaft 35 of button 18 to move transverse to rod 30. That movement of shaft 35 results in tapered end 37 moving from groove 36 to reside directly onto the ungrooved portion of shaft 35. The shifting of tapered end 37 from groove 36 results in rod 30 being forced in a direction toward the bottom end of handle 19 to depress spring 31. With spring 31 compressed, pin 38 of rod 30 depresses needle 29 of valve body 28. The depression of needle 29 opens valve 27 so that compressed gas will flow from the compressed gas source through valve 27 around rod 30 and shaft 35 and completely through passageway 25. The compressed gas exits passageway 25 into hose 12 where it flows from hose 12 out passageway 45 of tip 44 into the conduit containing line carrier 15 to propel line carrier 15 through the conduit.

After line carrier 15 pulls line 13 completely through the conduit, the user releases button 18. With button 18 released, the restoring force of spring 32 pushes button 18 back to the position shown in FIG. 2. With rod 30 no longer abutting the ungrooved portion of shaft 35, the restoring force of spring 31 will push rod 30 in a direction away from the bottom end of handle 19 until tapered end 37 again resides within groove 36. As a result, pin 38 releases needle 29 to close valve 27 and stop the flow of compressed gas. At this point, electrical wires can be attached to line 13 and line 13 wrapped about post 60 so that both line 13 and the electrical wires may be pulled through the conduit. Once the wires have been pulled through, line 13 is quickly and easily rewound by hand so that the next conduit may be strung with electrical wires.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims which follow.

We claim:

1. An apparatus for installing a line through a conduit, comprising:
    a handle including a passageway for conducting compressed gas through said handle;
    an inlet to said passageway adapted to be connected to a source of compressed gas;
    a cover said handle;
    a guard formed integrally with said handle;
    a spool formed integrally with said handle and connected to a first end of said line to dispense said line therefrom;
    a shield mounted to said handle and positioned about said spool to guide said line from said spool;
    a slot in said shield which allows said shield to be moved from a position about said spool to a position about said handle;
    a nozzle including means for conducting said line through said nozzle;
    a hose connected between said handle and said nozzle to deliver compressed gas to said nozzle; and
    line carrying means connected to a second one end of said line to carry said line through said conduit.

2. The line installing apparatus according to claim 1 further including a post formed integrally on said spool.

3. An apparatus for installing a line through a conduit, comprising:
    a handle including a passageway for conducting compressed gas through said handle;
    an inlet to said passageway adapted to be connected to a source of compressed gas;
    a cover for said handle;
    a guard formed integrally with said handle;
    a spool formed integrally with said handle and connected to a first end of said line to dispense said line therefrom;
    a shield mounted to said handle and positioned about said spool;
    a slot in said shield which allows said shield to be moved from a position about said spool to a position about said handle;
    a nozzle including a first passageway for conducting said compressed gas therethrough;
    a flexible hose connected between said handle and said nozzle;
    said nozzle further including a second passageway for conducting said line; and
    a line carrier connected to a second end of said line to carry said line through said conduit.

4. The line installing apparatus according to claim 3 wherein said nozzle includes a tip having first and second passageways, said first passageway for conducting compressed gas therethrough and said second passageway communicating with said first passageway for conducting said line therethrough.

5. The line installing apparatus according to claim 4 further including a hollow tube on said nozzle communicating with said second passageway to accommodate said line.

* * * * *